United States Patent [19]

Knecht et al.

[11] Patent Number: 4,578,735

[45] Date of Patent: Mar. 25, 1986

[54] PRESSURE SENSING CELL USING BRITTLE DIAPHRAGM

[76] Inventors: Thomas A. Knecht, 12309 Woodbine Rd., Minnetonka, Minn. 55343; Roger L. Frick, 125 Choctaw Cir., Chauhassen, Minn. 55317; John P. Schulte, 923-11th Ave. South, Apartment 1, Hopkins, Minn. 55343

[21] Appl. No.: 660,394

[22] Filed: Oct. 12, 1984

[51] Int. Cl.⁴ .......................... H01G 7/00; G01L 9/12
[52] U.S. Cl. ...................................... 361/283; 73/724; 29/25.41
[58] Field of Search ................. 340/870.37; 29/25.41; 361/283; 73/706, 708, 718, 724

[56] References Cited

U.S. PATENT DOCUMENTS

| | | | |
|---|---|---|---|
| 4,084,438 | 4/1978 | Lee et al. | 73/706 |
| 4,163,395 | 8/1979 | Medlar et al. | 73/708 |
| 4,168,518 | 9/1979 | Lee | 361/283 |
| 4,169,389 | 10/1979 | Yasuhara et al. | 73/718 |
| 4,177,496 | 12/1979 | Bell et al. | 361/283 |
| 4,207,604 | 6/1980 | Bell | 361/283 |
| 4,244,228 | 1/1981 | Lehnhardt | 73/716 |
| 4,301,492 | 11/1981 | Paquin et al. | 361/283 |
| 4,332,000 | 5/1982 | Petersen | 361/283 |
| 4,390,925 | 6/1983 | Freud | 361/283 |
| 4,398,194 | 8/1983 | Johnston | 340/870.37 |

OTHER PUBLICATIONS

Behr, M. and J. Giachino, A Miniature Pressure Sensor for Automotive Applications, I Mech E. Conference Publications 1981-10 (1981), presented at The Third International Conference on Automotive Electronics at London in Oct. 1981.

*Primary Examiner*—Donald A. Griffin

[57] ABSTRACT

A capacitive sensing cell is adapted for manufacture in a batch process, and uses a substrate or base from a rigid insulating material such as glass and a diaphragm assembly of a brittle semiconductor. The diaphragm assembly and the substrate are anodically bonded together. A very shallow recess is formed on either the diaphragm or the substrate to accommodate a deposited capacitor plate. Two such assemblies are connected together and the assembly is filled with noncompressible fluid to slightly bow the diaphragms away from the substrates. Differential pressure between the diaphragm assemblies is sensed by detecting the relative positions of the two diaphragms.

31 Claims, 10 Drawing Figures

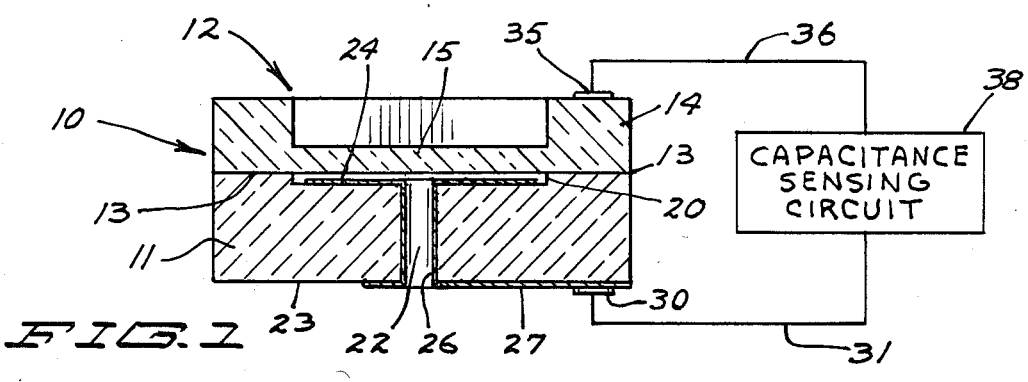
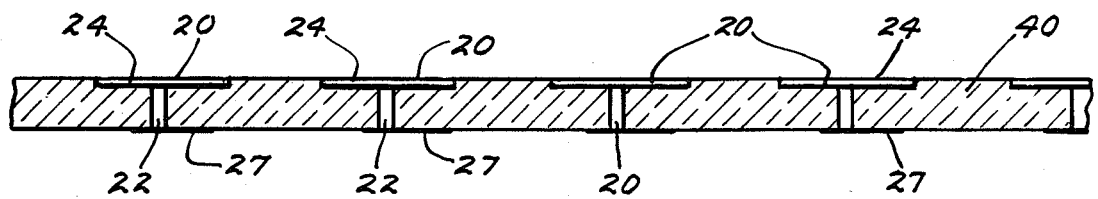
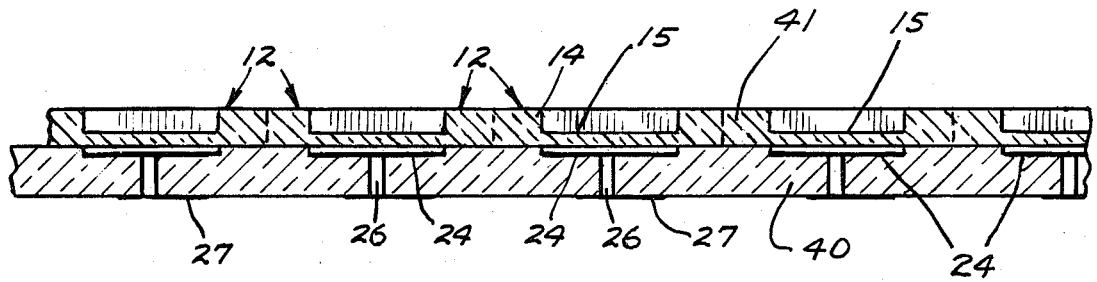
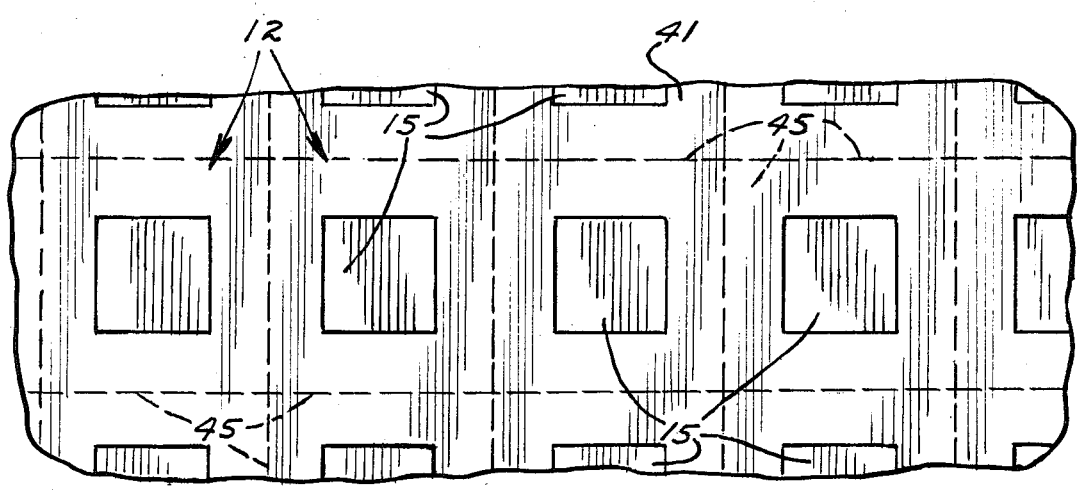

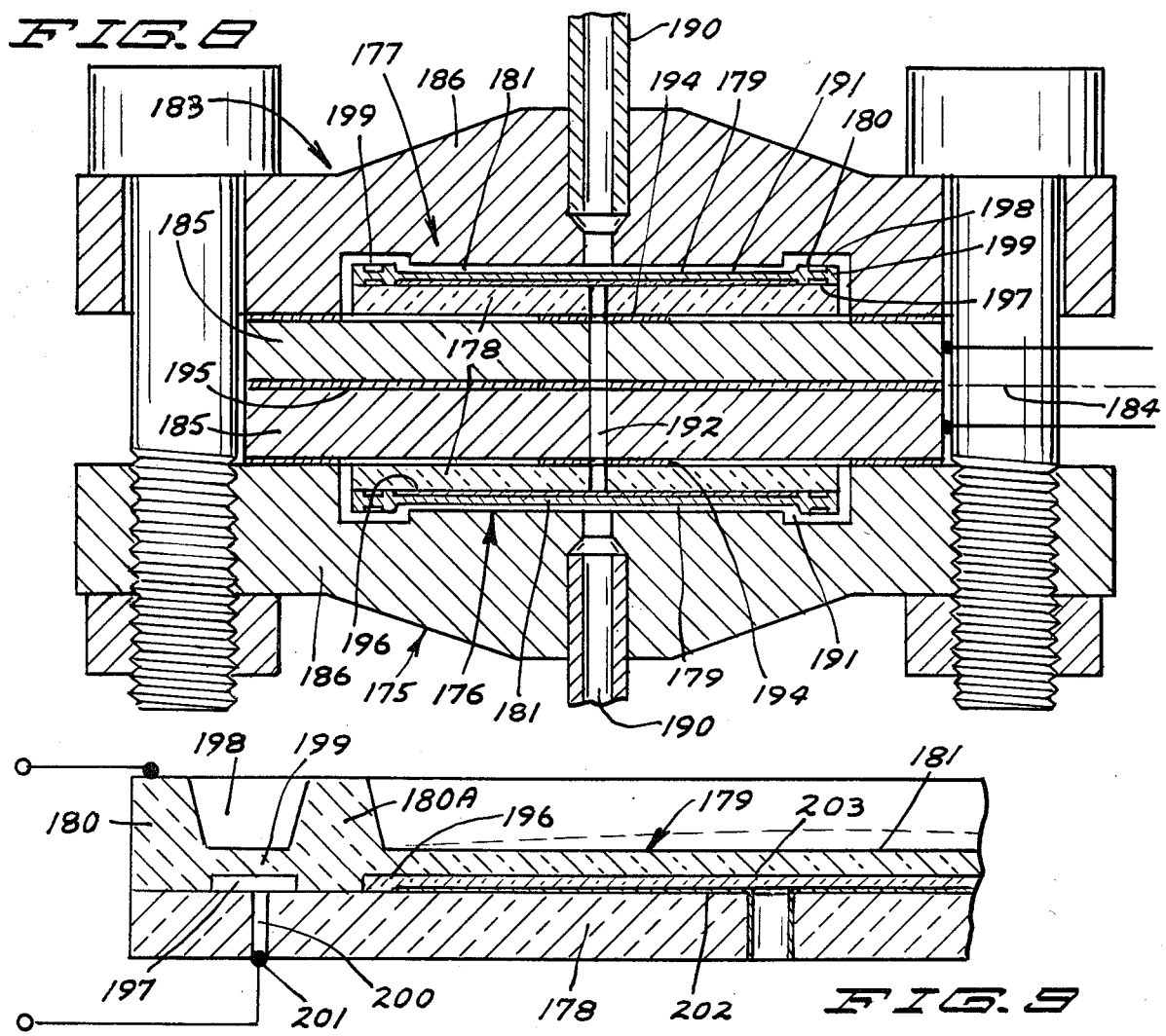
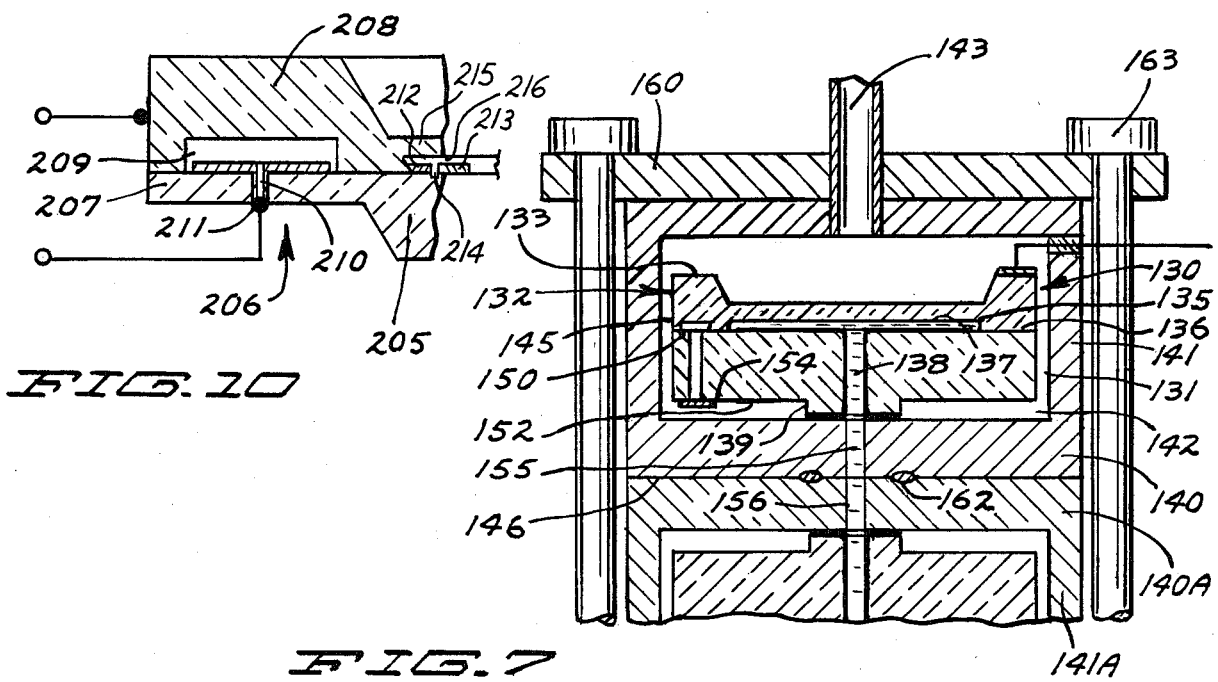

PRESSURE SENSING CELL USING BRITTLE DIAPHRAGM

CROSS REFERENCE TO RELATED APPLICATIONS

Reference is made to the copending U.S. patent application of Roger L. Frick, Ser. No. 660,396, filed on Oct. 12, 1984 and entitled "Capacitive Sensing Cell Made of Brittle Material", and Ser. No. 660,395, filed on Oct. 12, 1984 and entitled "Circuit For Capacitive Sensor Made Of Brittle Material".

BACKGROUND OF THE INVENTION

1. Field of the Invention

The present invention relates to a capacitive type differential pressure sensor having sensor cells with diaphragms made of a brittle material and constructed to permit batch processing.

2. Description of the Prior Art

Various pressure sensing devices have been advanced in the art which utilize deflecting diaphragms, the movement of which is detected to indicate pressure. Further, various pressure sensors, particularly differential pressure sensors, have utilized a fluid fill between the diaphragm and its support which deflect.

U.S. Pat. No. 4,177,496, for example discloses a capacitive pressure sensor comprising two discs made from a brittle insulator material, such as alumina, fused silica or glass, and which have spaced surfaces, facing each other, with conductive layers on such surfaces. A chamber is formed between the discs, and when the discs are subjected to external pressures the discs tend to move toward each other. The deflection of the discs is measured capacitively to provide an indication of the pressure acting on the discs. Portions of the discs are made to come into contact under overpressure to attempt to prevent damage to the sensor itself from excessive overpressures. A device similar to the one shown in U.S. Pat. No. 4,177,496 is also shown in U.S. Pat. No. 4,207,604.

A capacitive sensor shown in U.S. Pat. No. 4,168,518 is made of a material such as quartz and comprises two members that are joined together to form an interior chamber and which have portions that deflect toward each other in response to pressure acting on the exterior surfaces of the deflecting members.

U.S. Pat. No. 4,084,438 also shows a pressure sensing device which has spaced apart walls that are sealed at their peripheries to form an interior chamber, and capacitive sensing means on the inner surfaces of the walls, so that as the walls deflect under pressure and the spacing changes, an electrical signal is provided. The device shown in Pat. No. 4,084,438 further teaches the use of a material such as quartz for forming the sensor.

U.S. Pat. No. 4,332,000 shows capacitive pressure sensors formed from semiconductor material and discloses forming the sensor and the sensing circuity in the same process.

U.S. Pat. No. 4,390,925 also deals with a multiple cavity, pressure sensor formed on a silicon wafer.

U.S. Pat. No. 4,244,228 shows a pressure sensor which comprises slightly cupped shaped disc members that are joined at their peripheral edges and which will deflect under pressure. Under excessive pressures the plates will rest against each other. The discs are formed in a cup shape and made of a spring material in order to operate.

U.S. Pat. No. 4,301,492 shows a pressure sensor which utilizes diaphragms that are formed in a stacked arrangement, filled with fluid, and which will deflect relative to each other under pressure. This is sensed by capacitive sensors, and is compensated for errors due to temperature shifts. The chambers are formed by having the deflecting diaphragms spaced from each other by annular rims in a rest position. The sensor can be used for measuring differential pressures, but does require, in the form disclosed, recesses formed in the diaphragm discs to provide the necessary spacing.

When a fluid fill is used in a sensor, temperature changes affect the sensor due to the temperature coefficient of expansion of the fluid (usually a silicone oil) and the resulting changes in spacing of the diaphragm pressure sensing cells, which have sensing diaphragms on opposite sides of a center block, so that each of the diaphragms forms a separate chamber, with the chambers filled with fluid and fluidly connected and wherein differentials in pressure on the respective diaphragms will cause deflection of such diaphragms are shown in U.S. Pat. No. 4,398,194, and also in U.S. Pat. No. 4,169,389. Each of these patents teach that differences in temperature will cause different volumes of oil filling the space enclosed by the diaphragms. In U.S. Pat. No. 4,398,194 this difference in volume is compensated by the sensing circuitry, while in U.S. Pat. No. 4,169,389 the differences in volume are compensated for mechanically. In each of these patents a center, non-deflecting mounting block is utilized, as distinguished from the present device where chambers are formed from two plates, both of which will be deflected by external pressure variations.

U.S. Pat. No. 4,163,395 shows a sensor for sensing differential pressures that has flat diaphragms, the space between which is oil filled to set the diaphragm spacing. The diaphragms will "bottom out" under overload. An external sensor is used, apart from the deflecting diaphragm assembly, and the oil from the space between the diaphragms acts on the external sensor as pressure changes.

The use of brittle, semiconductor diaphragms on a rigid insulating substrate has also been advanced in absolute pressure sensors. A sensor of this type is shown in an article entitled "A Miniature Pressure Sensor For Automotive Applications", M. Behr and J. Giachino; I Mech E Conference Publications 1981-10 (1981), presented at The Third International Conference on Automotive Electronics at London in October 1981.

The prior art has examples of batch-fabricated absolute pressure sensors. The transition from making an absolute sensor of dissimilar materials, such as silicon and glass to a true differential batch fabricated sensor is a formidable task. The two sensor cells have to be attached to each other, stress isolated, oil filled and able to withstand high bidirectional overpressure of 1,000 to 10,000 psi and large line (static) pressures while accurately measuring (0.1 to 10 psi differential pressure. The present invention discloses structure for solving these problems.

SUMMARY OF THE INVENTION

The present invention relates to a differential capacitive sensor assembly having two sensing cells. Each sensing cell is adapted for manufacture in a batch process, and comprises a substrate or base plate from a rigid insulating material, preferably, and a semiconductor diaphragm plate. The diaphragm plate and the substrate or base plate are anodically bonded together at their perimeter. The center portion of the diaphragm and substrate are left unconnected so that a chamber is formed between the diaphragm plate and the base plate. Either the substrate or the diaphragm may be formed with a very shallow recess on the surface facing the joining member, and a passageway opens through the substrate to the recess. The diaphragm is supported on the substrate when the cell is initially made and thus the diaphragm will be supported on the base or substrate against overpressure. Two sensor cells are connected with a support having a fluid passageway open to the apertures in the substrates. The assembly, including the chambers in both sensor portions and the fluid passageway, is filled with noncompressible fluid to slightly bow the diaphragms away from the respective substrates.

The surface of the base facing the diaphragm is coated with a material suitable for forming a capacitor electrode, but the diaphragm assembly, made of a semiconductor, does not have any additional coating on it. Insulating materials such as alumina, fused silica, or glass such as borosilicate glass, such as that sold under the trademark Pyrex, are used for the substrate, and the semiconductor preferably is silicon or a similar material.

The glass to silicon bond formed by anodic bonding as described in U.S. Pat. No. 3,397,278, issued Aug. 13, 1968 to Pomerantz, is ideal for making capacitive sensors which use semiconductor diaphragms. Semiconductor diaphragms eliminate the need for one electrical feed through, as well as eliminating the need for coating the diaphragm to form a capacitor plate, while giving the advantages of a brittle material for the deflecting member. Even moderately high resistivity materials form excellent capacitors for capacitive sensing and the diaphragm can be considered a conductor for the preferred capacitive sensing used. The glass provides a good thermal match with the silicon, insofar as the coefficient of expansion is concerned, and the electrode is easily deposited on the glass in a batch process. The glass base is not a deflecting member, and can be relatively thick.

A number of sensor cells are constructed on a single glass disc or wafer using the glass for a sensor cell base with an overlying diaphragm that forms an enclosed chamber in a batch process as described herein and then separated into individual sensor cells. Two of the individual sensor cells are then coupled together with a support that has a fluid passageway open to chambers formed under the diaphragms of the two sensor portions. Noncompressible fluid is filled into the sensor cells to cause the diaphragms to bow outwardly from the bases and the assembly is mounted in a housing permitting different pressures to be sensed. A larger pressure on one diaphragm will cause it to move toward its base and the other diaphragm to bow out. The one diaphragm will be supported on its base before the other diaphragm bows outwardly enough to damage it, under high overpressure.

A practical differential pressure sensor of the type disclosed herein places many design constraints on the diaphragm assemblies. The diaphragm has to be securely bonded to the substrate around the periphery of the chamber formed. Anodic bonding is preferred for joining a crystalline semiconductor to an insulating base without degrading performance. Anodic bonding requires a method of stopping the bond from occurring over the deflecting portion of the diaphragm. The step or recess as shown defines the edge of the bond. The recess also accommodates the capacitor plate on the insulating substrate or base. The capacitor plate material and an optional insulating layer prevent anodic bonding of the central portion of the diaphragm. These layers also serve to reduce the volume of the recess and to minimize overpressure stresses by limiting diaphragm deflection during overload.

The recess depth must be substantially less than the deflection of the diaphragm relative to the base after oil filling the chambers formed by the center of the diaphragm and base, in order to reduce sensitivity to mismatch of the diaphragm assemblies. The oil volume of the recesses after assembly and the oil volume of the fluid passageway between the pressure sensor cells forming the differential pressure sensor must be substantially less than the oil volume of the chambers formed under the diaphragm, or expansion of the oil will cause large errors. The sensor must also take 1,000 to 10,000 psi overpressure. The ratio of the capacitor plate spacing of each cell after filling the chamber with oil, to the diaphragm size (lateral dimension of the deflecting portion), must be kept large enough to insure reasonable time response (nominally in the range of 1:100 to 1:500).

Previously described devices are not designed to meet the above requirements. Devices built according to this invention with 1-3 micron recesses have been shown to withstand over pressures of up to 10,000 psid even when the diaphragms are made thin enough to measure pressures in the 10 psi range with a high degree of accuracy under normal manufacturing tolerances.

In certain instances inaccuracies may be encountered because of substantial variations in static line pressure. In a modified form of the invention, means are provided for sensing line pressure using a separate portion of the sensor cell diaphragm.

The assemblies are low cost and easily made and at the same time reliable. The deflection of the diaphragms can be detected optically if desired, but capacitive sensing is the preferred way of determining diaphragm deflection.

BRIEF DESCRIPTION OF THE DRAWINGS

FIG. 1 is a vertical sectional view of an individual pressure sensing cell made according to the present invention;

FIG. 2 is a fragmentary enlarged sectional view of a piece of base material or substrate used for the pressure sensor of FIG. 1 in a first step on manufacturing the cell of FIG. 1;

FIG. 3 is a view of the material of FIG. 2 showing the pressure sensor of the present invention in a further stage of manufacture;

FIG. 4 is a fragmentary plan view of the material of FIG. 3;

FIG. 7 is a differential pressure sensor made according to the present invention having an outer housing made in sections with a metal seal;

FIG. 8 is a further modified form of the present invention;

FIG. 9 is an enlarged fragmentary view of a modified diaphragm assembly used in the sensor of FIG. 9; and FIG. 10 is a fragmentary view of a further modified diaphragm assembly incorporating a line pressure sensor therein.

DETAILED DESCRIPTION OF THE PREFERRED EMBODIMENTS

Figure 5:
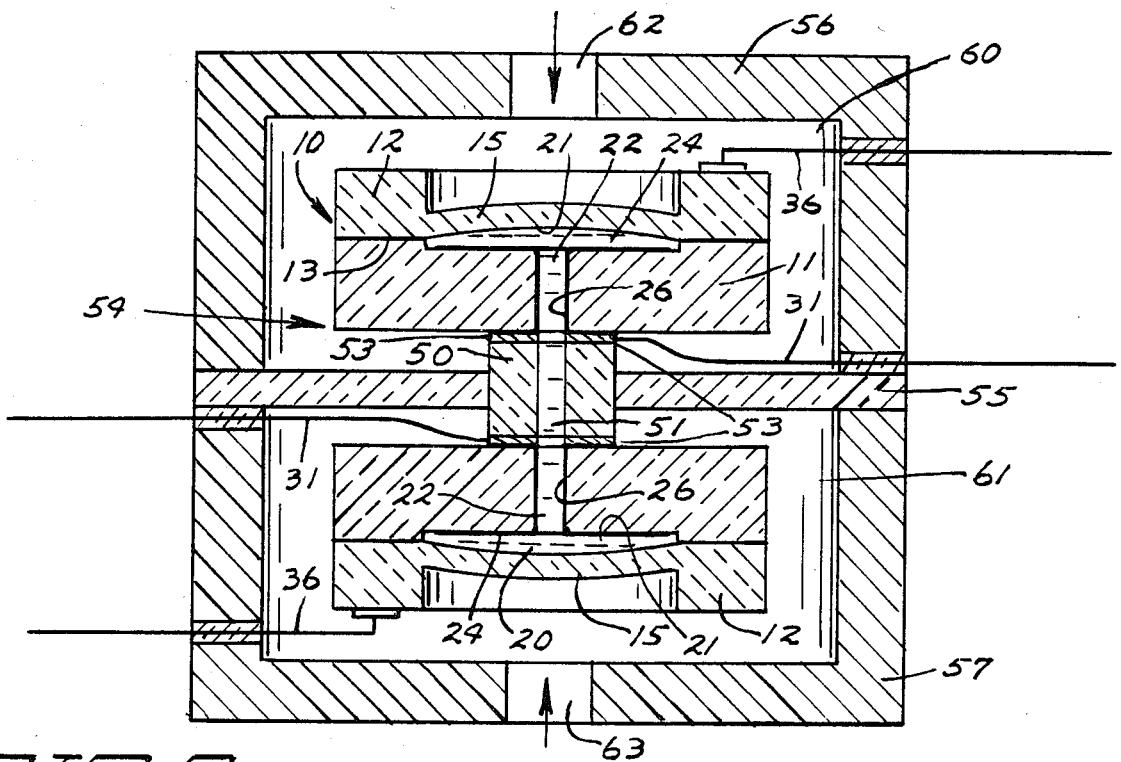
FIG. 5 is a vertical sectional view of an outer pressure sensing housing showing pressure sensor cells made according to the present invention installed for sensing differential pressure.

Referring to FIG. 1, a pressure sensing cell indicated generally at 10 made according to the present invention is formed with a rigid glass (Pyrex) base or substrate 11, that is formed with a outer edge surface and has substantial vertical height (thickness) so that it is rigid and does not deflect under the pressures being sensed. An integrally formed diaphragm assembly indicated generally at 12 is sealed and fused or bonded to the upper surface of the base 11 in an annular seal adjacent the outer edges 13 of the diaphragm. The diaphragm assembly includes an outer rim 14 and a center thin diaphragm member 15 that is integral with the rim 14. The rim is thicker than the diaphragm and provides support for the diaphragm member 15.

The diaphragm assembly 12 is preferably made of silicon, preferably of the P-type, to prevent a "Schottky" diode effect at the silicon/metal contact.

As shown, the base 11 has a center recess 20 that underlies and is aligned with the diaphragm member 15. The centrally located diaphragm member 15 is the deflecting portion of the diaphragm, and the surface 21 of the diaphragm member facing the recess is substantially contiguous to the facing inner surface of the recess 20. The recess is very shallow and the showing is greatly exaggerated in scale. The depth of the recess must be substantially smaller than deflection of the diaphragm after the sensor cell has been filled with oil.

The base 11 has a passageway or hole 22 extending from its lower surface 23 to the recess 20. In the process to be described, the surface of the passageway 22, and the surface of the recess 20 which faces the diaphragm surface 21 are plated with a suitable metallic material, such as platinum, to form a capacitor plate 24 facing the surface 21 of diaphragm member 15. This capacitor plate 24 is electrically connected to a metallic layer shown at 26 lining the passageway 22. Additionally, an electrical contact strip 27 connected to layer 26, and thus to plate 24, is plated on the under surface 23 of the base at least on one side, and a contact pad 30 (made, for example, of aluminum) is attached to this strip 27. A lead 31 can be attached to the pad 30 to lead to remote circuitry indicated at 38.

The diaphragm assembly 12 is preferably made of a semiconductor, such as silicon, as explained, and the diaphragm surface 21 will act as a capacitive plate surface without any additional plating or coating. The capacitive effects of the sensor conductor are satisfactory even though the material has substantial resistivity. An electrical contact pad 35 is attached to the rim 14 of the diaphragm assembly in a suitable manner, and a lead 36 is also connected to remote circuitry. When assembled into a differential pressure sensor housing the circuitry will be used for detecting differential capacitance between the two capacitors formed in the two sensor cells.

This cell construction simplifies construction of brittle diaphragm capacitive type sensors because no additional plating is necessary on the diaphragm surface to form a capacitor plate on the diaphragm, and the joining together of the base and diaphragm of two different materials lends itself well to batch processing. No foreign materials whatsoever are needed on the sensitive diaphragm surface 21, and the excellent mechanical properties of the silicon are not degraded with electrodes or deposited thin films on such sensing surface.

The glass (Pyrex) base 11 provides a good temperature expansion coefficient match with the silicon, and the glass base can carry the other capacitor plate or electrode and the feed through conductor 26. This does not adversely affect performance, since the base 11 is not a deflecting member and can be relatively thick. The recess in the base has a depth preferably only equal to the thickness of the plate or layer 26, so that at rest the diaphragm surface 21 is substantially contiguous to and supported on the layer. The recess shown in the glass base may be omitted and a recess may be formed in the diaphragm facing the glass base, which will receive a capacitor plate deposited on the glass base.

The sensor assembly lends itself to batch fabrication, and in the steps of fabrication, as shown in initial stages in FIG. 2, a wafer or disc of borosilicate glass (Pyrex) indicated at 40 is shown fragmentarily, and is provided with a plurality of holes 22 spaced at desired intervals, which form the holes or passageway 22 in the individual sensor cells. The glass disc as shown also has central recesses 20 formed with conventional etching techniques in the glass surface. The apertures 22 are preferably centered in the recesses 20. The recesses 20 are spaced a desired amount to provide the necessary lateral dimension for forming the bases 11 for the pressure sensing cells 10 shown in FIG. 1.

The glass disc 40 is plated on both sides with a conductor having fairly low resistivity, such as platinum, and then using photo resist techniques, the unwanted metal layer is etched away to form the capacitive plates 24 on the upper surface of each of the recesses 20. The passageways 22 are also surrounded by a deposited platinum layer 26. The conductive paths 27 also are provided by the plating on the lower side of the glass disc 40, to provide the necessary electrical connections, as needed. This can be done by thin film deposition techniques such as vapor deposition, or by sputtering.

If stress isolation necks are to be formed for the sensor cells, the glass disc 40 would be etched at this stage to leave a neck around the openings 22, as will be shown in FIG. 5.

A silicon wafer 41 is etched to form the diaphragms 12 by etching recesses into the upper surface of the wafer to form the deflecting portions 15, surrounded by rims 14. The wafer 41 is placed on the glass sheet or disc 40 with the deflecting portions 15 aligned with the capacitor plates 24 on the glass disc 40 and anodically bonded to the glass disc in the areas of contact between the semiconductor wafer and the glass disc.

If the diaphragms are to be provided with recesses in their surfaces 21 overlying the capacitor plates 24, with no recesses in the glass and with the capacitor plates 24 then deposited on the upper surface of the glass sheet and raised from such upper surface, the recesses on the under surface of the diaphragms formed on silicon wafer 41 can be etched at the same time that the upper diaphragm recesses are etched. The upper surface of the wafer 41 is metallized and annealed to form an ohmic contact. This layer may then be used for attaching leads for the sensing circuitry.

After anodic bonding there will be substantially zero gap between the diaphragms and the bases to provide overpressure protection.

As shown in FIG. 4 by the dotted lines 45, after the wafer 41 has been bonded to the glass substrate in the manner described, the silicon/glass assembly is diced to form the individual pressure cells. Also, in the drawings a space is shown between the outer surface of the respective capacitive plate 24 and the surface 21 of the respective diaphragm member 15. This too is for illustrative purposes. The surface 21 and the surface of the underlying capacitive plate 24 will actually be substantially contiguous.

When the sensor cells have been cut (or diced), the individual cells may be further mounted to each other and in outer housings as desired. The sensor cells 10 at this stage will be as shown in FIG. 1.

In summary, the process is as follows:

A p-type silicon wafer (2"-6" dia) is etched, from both sides if desired, on one side to form the diaphragm portion 15 and on the other side to form the capacitor plate recess if it is to be used. It is metallized on the outside and annealed to form an ohmic contact. A glass disc (or wafer) has small holes formed and is then metallized on both sides (including through the holes). The metal on one side is made to form the capacitor electrode. A dielectric material can be deposited over the electrode metal if desired, as will be explained. The glass disc is optionally etched on the nonelectrode side several mils to form a center neck for mounting stress isolation purposes. The silicon and glass wafers are anodically bonded to form zero gap between them in the capacitor area before the oil fill. This feature affords considerable overpressure protection. The bonded wafers are then diced up.

The cells using the brittle material diaphragm member 15 and the nondeflecting or rigid glass base 11 are adapted for utilization in differential pressure sensors. Referring to FIG. 5, a typical arrangement is shown. The sensor cells 10 are identically constructed to that described in connection with FIG. 1, and each includes the diaphragm assembly 12 having the deflecting center diaphragm member 15 fixed to the glass base 11, with the conductive layer forming capacitor plate 24 facing the surface 21 of the diaphragm member 15. There are two such pressure sensing cells 10 in the pressure sensor shown in FIG. 5, and, as shown, they are supported together with a rigid glass tube 50 that is positioned so that its center passageway 51 aligns with both of the passageways 22 of the sensor cells 10. A suitable glass frit indicated at 53 is used at opposite ends of the tube 50 is used to fix the respective cell assembly 10 to opposite ends of the tube 50. The two sensor cells and tube form a differential pressure sensor cell indicated generally at 54.

The differential pressure sensor cell 54 is in turn suitably mounted to a support plate 55, that forms a dividing plate between two housing sections 56 and 57, each of which has an annular wall suitably attached to the plate 55 adjacent its periphery. The walls of the housing sections 56 and 57 form chambers indicated at 60 and 61, respectively that surround and enclose the respective pressure sensor cell 10. The outer surface of the support tube 50 is sealed with respect to an opening in the support plate 55, so that the chambers 60 and 61 are sealed from each other as well.

A suitable filling of substantially noncompressible fluid, preferably silicone oil is introduced into the chambers 20 of each sensor cell 10, the passageway 22 and the center passageway 51 of the tube 50 before the housing sections 56 and 57 are assembled in place. The initial fill pressure of oil in the chamber will cause an outward deflection of the diaphragm members 15. Differentials in pressure in the chambers 60 and 61 will cause inward deflection of one diaphragm member 15 and an opposite deflection of the other diaphragm member 15 once the filling of oil has been made in the chambers 20 of the first and second sensor cells 10. The oil filling is made to exert an initial fill pressure (P) sufficient to cause the diaphragms 15 to bow outwardly slightly. FIG. 5 is exaggerated to show such bow.

The gap between the surface 21 and the capacitor plate 24 is as small as possible at assembly so that the diaphragms 15 are stopped mechanically by coming into contact with the respective capacitor plate 24 with only very slight inward bowing toward the plate 24 under overpressure conditions. In any event, the inwardly bowing diaphragm member 15 is mechanically stopped before the outward bowing of the other diaphragm member 15 in the other sensing cell causes excessive stress in the other diaphragm member 15. The capacitor plates 24 provide, therefore, an overpressure stop arrangement for the diaphragm members 15 of the respective sensing cells 10 as the diaphragm members deflect inwardly under pressure.

Additionally, the bases 11 of the first and second pressure sensing cells 10 shown in FIG. 5 are stress isolated from pressure caused loads in the opposite housing sections by the spacing obtained with the glass tube 50.

The differential pressure between the chambers 60 and 61 will cause opposite, but equal, deflection of the diaphragms 15. For example, if the pressure in chamber 60 is greater than that in chamber 61 the first diaphragm 15 (the upper one shown in FIG. 5) will deflect toward its associated capacitor plate 24 and the second diaphragm 15 of the lower cell, in chamber 61 will be deflected away from its associated capacitor plate 24. The noncompressible fluid filling the chambers 20 and passageways 22 and 51 will transmit the pressure induced motion. The spacing changes then would be sensed as capacitance changes with suitable circuitry, for example that disclosed in U.S. patent application, Ser. No. 660,395, filed on even date herewith, entitled Circuit For Capacitive Sensor Made Of Brittle Materials, owned by the same assignee as this application.

In order to assure reasonable time response the ratio of the diaphragm to capacitor plate spacing to the lateral dimension of the diaphragm must be kept reasonably large, for example, ranging from one to one hundred to one to five hundred.

The leads 36 from the sensor cells 10 pass through suitable openings in the walls of the housing section and are sealed in place with fused glass. The leads 31 may be embedded in the glass frit joining the respective housing sections to plate 55.

Figure 6:
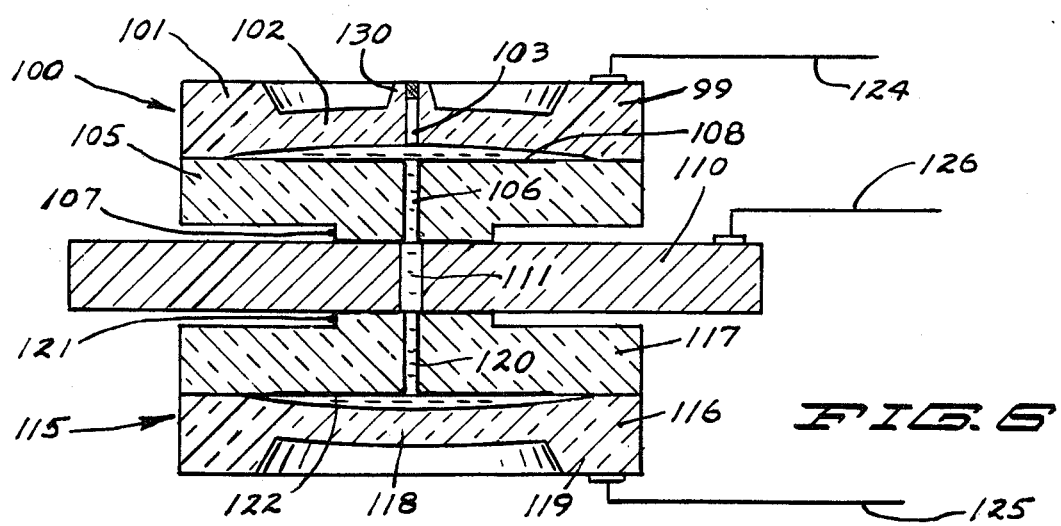
FIG. 6 is a modified differential pressure sensor made according to the present invention.

In FIG. 6 a modified form of the invention is shown, again utilizing similarly constructed sensor cells, but showing a type of construction which also provides stress isolation of the two cells under diffrential pressures.

In this form, a first pressure sensor cell 100 includes a diaphragm assembly 101 formed in the same manner as the previous form of the invention with a center thin diaphragm member 102 and a peripheral rim 99. In this form there is a bore 103 formed through the diaphragm member. The diaphragm assembly is supported on a glass base 105, at its outer edge portions as in the previous forms of the invention, and the diaphragm member 102 is free to deflect to a bowed position when it is filled with a noncompressible fluid. The glass base 105 has a center opening or passageway 106 therein aligning with the passageway 103. A stress isolated boss or neck portion indicated at 107 is provided on the surface of the glass base 105 opposite from the diaphragm assembly 101, and the end surface of this neck is in turn affixed to or bonded to a central divider-support plate 110. Plate 110 is an electrical conductor material or a ceramic with a metallized pattern on it in this form of the invention. The support plate 110 has a center passageway 111 therein that aligns with the passageway 106, and on the opposite side of the support plate 110, a second sensor cell assembly 115 is supported. The cell assembly 115 includes a diaphragm assembly 116, bonded and sealed at its peripheral edge to a glass support disc or base 117, to leave the thinner diaphragm member 118 of the diaphragm assembly free to deflect relative to the base 117. The base 117 has a central passageway 120 which aligns with the opening or passageway 111. The surfaces of the bases 105 and 117 facing the respective diaphragm members in both of the sensor cells 101 and 115 have conductive film layers forming capacitor plates 108 and 122 thereon forming sensing capacitors in combination with the facing surface of the diaphragms.

The base 117 also has a boss or neck portion 121 that has an end surface fused to or in another way fixed to the support plate 110. The diaphragm members 101 and 116, respectively, have suitable leads thereon as shown at 124 and 125. The conductive layers 108 and 122 that form capacitor plates extend along the interior of the passageways 106 and 120 in the same manner as in relation to passageway 22. Conductive layers extend from the capacitor plates 108 and 122 through the passageways 106 and 120 and these are electrically connected to the support plate 110. The capacitor plates 108 and 122 are thus electrically connected to the support plate 110 which forms a common potential lead for the two capacitors formed in the two pressure sensing cells. A suitable lead 126 is provided to the support plate 110.

The passageways 106 and 120, as well as passageway 111 and the chambers formed by bowing diaphragm members 102 and 118 and are filled with a suitable oil filling through a suitable sealable connector 130 leading to the passageway 103. The diaphragms would be bowed out a desired amount with the oil filling (noncompressible fluid) and then closed off, and once the support 121 was placed into a outer housing the support 121 would form a divider for the two chambers such as chamber 60 and 61 shown in FIG. 5, and then as the diaphragms deflect a suitable signal will be provided indicating the differential in pressure between the two chambers.

One diaphragm will stop against its respective base when excessive differentials in pressure cause one of the diaphragm members to move toward its respective plate and the other to move farther away. The amount of oil filling is selected so that the diaphragm that is moving toward its associated base under high differentials in pressure will be supported substantially fully on its surface on the adjoining surface of its base before the opposite bowing diaphragm (moving away from its base) is overstressed. In this way, the diaphragms are protected against overstress and failure.

Temperature changes will cause a change in volume of the oil, but the volume is quite small and does not cause a significant problem.

The use of silicon, or brittle semiconductor for the diaphragm eliminates the need for one feedthrough and a plated capacitor plate. Even with relatively high resistivity, the silicon is a conductor sufficient for capacitor sensing.

FIG. 7 shows a differential pressure sensor including means for sensing line pressure to provide a signal that can compensate sensed outputs for static line pressure. Only half of the pressure sensor used for sensing differential pressure is illustrated, but the other half is a mirror image along a parting plane as will be explained.

A pressure sensor cell indicated generally at 130 is made substantially the same as in the previous forms of the invention, and includes a substantially rigid glass base 131, and a diaphragm assembly 132 made out of a suitable semiconductor material, such as silicon. The diaphragm assembly 132 has a rim 133, a central diaphragm member or section 134, and in this form of the invention there is a shallow recess shown at 135 on the surface of the diaphragm member 134 facing the base 131.

The base 131 and the diaphragm member 134 are fused together around a periphery as shown at 136, to form an interior chamber. A capacitor plate 137 is deposited on the upper surface of the glass base 131 in this form of the invention, and the recess 135 is made so that it accommodates this capacitor plate 137 with very little clearance, and without causing the diahragm member to bow around the film forming capacitor plate 137. As will be explained the capacitor plate may have an overlying layer of dielectric material to fill the volume of the recess 135. When assembled, and before being filled with oil, the diaphragm will be substantially in contact with the adjacent surface of the base.

The glass base 131 has a central aperture or passageway 138, and a stress isolation support neck 139 supports the glass base in a spaced relationship to a housing base 140. The housing base 140 in turn is connected to a housing cup 141 around the perimeter of the housing cup wall to form an interior chamber 142 into which pressure can be introduced. The chamber 142 has an opening 143 in a tube leading to a source of pressure to be measured.

The diaphragm rim 133 defines a recessed receptacle forming a line pressure sensor 145. The line pressure sensor 145 is used for sensing the line pressure in one of the chambers of the housing.

The sensor 145 forms an enclosed chamber, 150 under the rim 133 and a hole is formed through the glass base 131 through which the chamber 150 is evacuated to a desired level (0–15 psi absolute). The hole and chamber 150 are sealed with a plate 154 that is bonded over an access opening leading to the interior of the chamber 150. A deposited lead 152 is connected to a capacitor plate deposited on the base 131 in alignment with the chamber 150. The opening through the base leading to the chamber 150 is also coated with deposited metal and connects to the lead 152. The line pressure acting on the sensor cell causes deflection of the region of rim 131 in the chamber 150. The lead 152 and a lead connected to the diaphragm rim 133 are used for sensing a capacitance signal that will indicate deflection of the diaphragm relative to the base under changing line pressure.

The line pressure sensor 145 is formed by merely etching another cavity or chamber 150 in the rims of the silicon diaphragm while it is still in batch (wafer) form. Similarly, the added through holes for the line pressure sensor in the glass substrate and subsequent metallizing is also done in wafer form before the glass and silicon wafers were bonded and diced up.

A compensation signal from the line pressure sensor described can be provided to the sensing circuitry for the differential pressure sensor assembly to accommodate static line pressure variations, which may be quite large.

As shown in FIG. 7 the housing sections housing the individual sensor cells are held together and sealed in a suitable manner. As shown, the neck 139 is fused to the housing base 140 so that the glass sensor base 131 is held securely on the housing base 140, after which the housing cup 141 is sealed or welded to the housing base 140. The housing base 140 has an opening 155 therein aligning with the opening 138, and a corresponding opening 156 is provided in a second housing base 140A of an identical pressure sensor housing. The second housing extends in opposite direction from the housing shown and houses a sensor cell including a base 131A having a neck 139A fused to base 140A.

In order to seal the two housings together, and in particular the housing bases 140 and 140A, a separate plate 160 is placed over the end of each of the housing cups 141 and an annular metal gasket or seal indicated at 162 is placed around the openings 156 and 155 along the parting plane 146. Suitable bolts or cap screws 163 then are clamped through the plates 160 (there will be a plate on the opposite end of the assembly as well) to hold the two housing cups together and tightly compress seal 162 to seal the passageways between the two housing bases. The interior chambers under the diaphragms 134 and the passageways 138, 155 and 156 will all be filled with noncompressible fluid and sealed so that the fluid will be contained within the chambers. Deflection of one of the diaphragms 134 relative to its base 131 will cause an opposite deflection of the other diaphragm in the other sensing cell.

In FIG. 8, a further modified form of the invention is shown, and includes a differential sensor 175 which has a pair of pressure sensing cells 176 and 177, respectively. Each of these cells 176 and 177 include a glass base 178, and a diaphragm assembly 179. Each base is made of suitable glass or other material, and the diaphragm assemblies 179 are made of silicon or other semiconductor materials as previously described. The diaphragm assemblies 179 has rims 180 around the periphery, and center deflecting diaphragm sections 181 that will deflect relative to the base, and which when bowed outwardly form chambers between the deflecting sections 181 and the respective base or substrate. The chambers formed are filled with noncompressible fluid as previously described.

The sensor bases 178 are enclosed within housing sections indicated generally at 183 on opposite sides of a center parting plane 184. The housing sections include housing base portions 185,185 and housing caps 186 which in this form of the invention can be made as a molded unitary cap. The housings may be made in several sections, if desired. Suitable inlet openings 190 in tubes lead into interior chambers 191 formed in the housings and within which chambers and sensing cells are located.

The housing bases 183 have passageways 192, leading to interior passageways 193 in the sensor cell bases 178. The sensor cell bases 178 are supported and spaced from the respective facing surface of the housing bases 185 by a thin layer of glass frit or other suitable seal materials indicated at 194 that surround the openings 192 and 193. The layers of glass frit 194 form collars which space the sensor cell bases 178 from the housing bases. This support provides stress isolation, as did the support tubes or necks in the previous forms shown. Also, the housing bases 185 are sealed with a suitable gasket or seal material 195 between the bases, along the plane 184. Thus, there is a fluid passageway between the two sensor cells or sections. The diaphragm members 179, as shown, have recesses 196 in their under surfaces and the sensor will be filled to a suitable pressure level with a substantially noncompressible fluid to cause a slight bowing out of the diaphragms.

The diaphragm rim members 180 in this form of the invention are bonded to the surface of the mating glass sensor base 178. At least one of the rim members 180 has a recess 197 defined therein. This recess 197 forms a chamber that can be evacuated. An upper recess 198 is also etched into the rim 180 to provide a narrow deflecting diaphragm section 199 just above the recess 197. The deflecting diaphragm section will deflect as the line pressure changes. A suitable capacitive plate is formed by a conductive layer on the glass base 178 in alignment with the recess 197. The deflecting diaphragm portion 199 in one of the housing chambers is used as a second capacitor plate when connected to suitable circuitry to measure the deflection of diaphragm portion 199, caused from pressure changes in one housing chamber 191. The recess 197 is peripheral as shown, that is it extends around the square periphery of the sensor cell and is evacuated. The recess 197 could be made in one or more separate locations on the rim of the diaphragm assembly if desired.

FIG. 9 is an enlarged scale showing of the edge of a sensor cell shown in housing chamber 191 in FIG. 8. As shown in exaggerated detail, the diaphram assembly 179 has the shallow recess 196 formed in the deflecting portion of the silicon diaphragm member overlying the metal capacitor plate formed on the glass base 178. A passageway 200 is provided to permit evacuating the chamber formed by recess 197, and then the chamber is sealed with a suitable ball type seal member 201 while the recess 197 is held under vacuum. The ball seal 201 may be fused into place. A lead for the capacitor plate formed on the glass base 178 for sensing line pressure also may be attached to a conductive coating in passageway 200. The recess 197 can be formed under a portion of the diaphragm 179 near its edge. For example, the inner portion of the rim shown at 180A could be removed to the level of the deflecting diaphragm portion 181. Also, in some instances the recess 198 would not be necessary and the chamber 197 would be formed to provide a wall portion that deflected sufficiently for measurement without upper recess 198.

The capacitor plate deposited on sensor bases 178 of the sensor cell is shown at 202 in FIG. 9, and as shown a dielectric layer 203 has been deposited over the capacitor plate. This dielectric layer can be deposited during the initial processing steps, before assembly of the diaphragm to the respective base. As shown, the dielectric layer extends around the periphery of the deposited capacitor plate 202 and is of size to fit into the recess to take up the recess volume and support the diaphragm when it is subjected to overpressure. When the recess is formed in the glass base, as shown in FIG. 2, the dielectric layer can be used to fill the recess to be level with the glass base surface after the capacitor plate has been deposited on the glass base. The area for the dielectric can be masked when it is deposited. The deposited dielectric material may be silicon dioxide, or silicon nitride, for example. The dielectric material must be a material that does not form an anodic bond to the diaphragm when the diaphragm rim is bonded to the base.

A modified form of the line pressure sensor is shown in FIG. 10, wherein the sensor glass base is formed with a thin outer peripheral edge. As shown, the sensor glass base 205 has a peripheral recess 206 (the base is square, as shown in the first form of the invention) to form a thinner deflecting ledge indicated at 207 directly under a rim 208 of a diaphragm assembly 215 made out of silicon. A recess 209 is formed in the rim, overlying the narrow or thin ledge portion 207. The recess 209 is made so there are support members or feet on opposite sides of the rim to provide support for the glass base. A passageway 210 is provided in the narrow ledge to permit evacuating the recess 209 and then sealing it with a conventional ball bond 211. The surface of the glass base 205 and the surface defining passageway 210 are coated with a metal film to form a capacitor plate and lead for such plate under the diaphragm rim. The diaphragm surface overlying the ledge 207 forms the second capacitor plate for sensing static line pressure.

In the form of the invention shown in FIG. 10, the glass ledge deflects under pressure instead of the silicon rim 208, and the deflection of the facing surfaces can be measured capacitively.

Static line pressure compensation can be used for the sensing circuits of the sensor cells by measuring the line pressure or static pressure through the use of the sensors shown. The static line pressure sensors can be used to provide a second output signal which accurately indicates static pressure in addition to the signal representing differential pressure.

A further modified capacitor plate assembly is also shown on base 205. The sheet from which the base is formed, is plated on its entire upper surface, as was described, and when the unwanted metal is etched away using known photo resist techniques, an outer metal filler ring 212 is separated from the capacitor plate 213 by an etched groove 214. The filler ring 212 is the shape of the diaphragm (square) and is not electrically connected to the active capacitor plate or electrode 213 and fills the volume of the cavity 216 shown under the deflecting portion of diaphragm assembly 215. The edges of the active capacitor plate 213 are desirably spaced from the periphery of the cavity 216 to insure reliable outputs when the diaphragm deflects. The ring 212 and capacitor plate 213 may be covered with a dielectric layer to further take up the volume of cavity 216. The ring 212 forms a filler in the cavity to occupy the volume, but, is not an electrically active element.

Although the present invention has been described with reference to preferred embodiments, workers skilled in the art will recognize that changes may be made in form and detail without departing from the spirit and scope of the invention.

What is claimed is:

1. A differential pressure sensor assembly having first and second sensor portions;
    said first and second sensor portions each comprising a pair of plates, a first of which is a brittle semiconductor material, and a second of which is a rigid insulating material, said plates initially being substantially contiguous to each other along first surfaces of said plates and sealed together along an encompassing line with portions of said first surfaces being unconnected to permit movement of said first semiconductor plate of each sensor portion relative to the other plate of the same sensor portion to form first and second chambers, respectively, in each of the first and second sensor portions;
    each of said second plates having capacitive electrode means on the first surfaces thereof facing said semiconductor plates of the respective sensor portion to permit measuring differences in spacing of said facing surfaces by measurement of capacitance between the semiconductor plate and the capacitive electrode;
    fluid conduit means for connecting said first and second chambers, respectively;
    a quantity of substantially incompressible fluid filling said first and second chambers and to said fluid conduit means to space the semiconductor plates from the second plates;
    housing means to permit subjecting at least one of the plates of each sensor portion to a pressure tending to move the plates forming each sensor portion together, the pressure acting on the respective sensor portion being at least at times different from the pressure acting on the other sensor portion, whereby the incompressible fluid will be forced into one chamber from the other chamber and cause increase in bending stress of the plates in one of said sensor portions and a decrease in bending stress of the plates of the other sensor portion; and
    said other sensor portion reaching a condition wherein the first and second surfaces of the plates forming the other chamber are substantially contiguous before either of the plates forming the one sensor portion reach an excessive stress level.

2. The differential pressure sensor assembly of claim 1 and a recess formed in one of the plates of each sensor portion aligned with the capacitive electrode, the recess being of substantially less volume than the volume of the incompressible fluid filling the respective sensor chambers when both the sensor portions are at substantially the same external pressure.

3. The differential pressure sensor of claim 2 wherein the capacitor electrode is of size and thickness to occupy a substantial portion of the volume of the recess.

4. The differential pressure sensor of claim 1 wherein the volume of fluid conduit means is substantially less than the volume of the incompressible fluid filling each of the chambers at equal pressure on both of the sensor portions.

5. The differential pressure sensor of claim 1 and electrically nonactive filler means adjacent the capacitor plate on each second plate to substantially fill the volume of the recess.

6. The differential pressure sensor of claim 5 wherein the recess is formed in the semiconductor plate and the filler means comprises a metal ring portion surrounding the capacitor electrode on the surface of the glass base.

7. The differential pressure sensor of claim 1 and a dielectric layer overlying the capacitor electrode on each second plate, the size and shape of the capacitor electrode and the dielectric layer being substantially the same size and shape as the recess, and fitting within the recess when the plates of one sensor portion re supported on each other.

8. The differential pressure sensor of claim 1 wherein the spacing of the two plates of each sensor portion is from about 0.01 to 0.002 times the minimum lateral dimension of the deflecting portion.

9. A differential pressue sensor assembly comprising:
first and second pressure sensor cells, said first and second sensor cells each including a base of rigid insulating material and a brittle semiconductor diaphragm mounted on a surface of said base and fused to the base to enclose a chamber, an aperture formed through each base open to the center portion of the respective diaphragm;
a housing enclosing each sensor cell and including rigid divider means for separating the sensor cells;
means for defining a sealed passageway through the rigid divider means opening to the apertures in the bases of both sensing cells, said means for defining including supports to space the bases of the respective sensor cell from the divider means except adjacent the respective apertures to stress isolate the sensor cells with respect to the housing;
a filling of substantially noncompressible fluid in said apertures and said passageway under a pressure sufficient to support the center portions of the respective diaphragm to be spaced from each of the bases to form fluid filled chambers, whereby pressure differentials on the outer surfaces of said diaphragms will tend to cause one of the diaphragms to move toward its respective base while the other diaphragm bows out further from its respective base; and
means to permit sensing deflection of the center portion of at least one diaphragm relative to its associated base.

10. The apparatus of claim 9 wherein the insulating base of each cell has a first capacitor electrode deposited thereon on a surface facing the respective diaphragm, the second semiconductor diaphragms forming a second capacitor electrode, said first and second electrodes on each sensor cell comprising the means for sensing deflections of the diaphragm.

11. The apparatus of claim 10 wherein the diaphragm and base of each sensor all have first surfaces which face each other and a recess formed in one first surface of each sensor cell aligned with the deposited first capacitor electrode of that sensor cell.

12. The apparatus as specified in claim 11 wherein said diaphragm comprises a deflecting center section and an integral peripheral rim in contact with the base, and said diaphragm and said base being anodically bonded together.

13. The apparatus as specified in claim 12 wherein said base is made of glass and the recess is formed in the surface of said glass adjacent the diaphragm.

14. The apparatus of claim 11 and a layer of dielectric material overlying the first electrodes, the dielectric material and the first electrodes substantially occupying the volume of the recess.

15. The apparatus as specified in claim 10 wherein the bases each have a neck portion surrounding the opening in that base, the neck portion being of substantially smaller lateral dimensions than the main portion of the base, said neck portions supporting the respective sensor cell on the rigid divider means and comprising the supports in the means for defining.

16. The apparatus as specified in claim 10 wherein said rigid divider means comprises an electrical conductor.

17. The apparatus as specified in claim 10 wherein said rigid divider means comprises two rigid plates, and a metal seal compressed between said plates and surrounding the opening through said rigid divider means.

18. The apparatus of claim 10 wherein said means for defining comprises a rigid tube member, the bases of the respective sensor cells being rigidly supported on opposite ends of said rigid tube, with the passageway being defined on the interior of the rigid tube and aligned with the openings of the respective bases, the rigid tube being supported on the rigid divider means and the ends of the rigid tube extending beyond the rigid divider means a preselected amount.

19. The apparatus of claim 10 wherein the housing defines separate housing chambers for each pressure sensing cell, and line pressure sensor means for sensing the pressure in at least one housing chamber independently from the pressure in the other housing chamber.

20. The apparatus of claim 19 wherein the line pressure sensor means comprises a line pressure sensor diaphragm formed on the diaphragm of at least one sensor cell and separated from the diaphragm portion of the sensor cell forming the sensor chamber of that pressure sensor cell.

21. The apparatus of claim 19 wherein the line pressure sensor comprises a reduced thickness ledge on the edge of the base underlying a portion of the diaphragm for that sensor cell, and second chamber means formed on the associated diaphragm in alignment with the ledge and fluidly separated from the chamber formed by the center portion of the diaphragm of that pressure sensor cell.

22. The apparatus of claim 21 wherein said recess is formed in the surface of the diaphragm facing the base.

23. A capacitive differential pressure sensor assembly comprising first and second sensor elements mounted with respect to each other:
said first and second sensor elements each including an insulating substrate plate, and a semiconductor diaphragm plate mounted on a surface of said substrate plate and bonded to the substrate to enclose the center portions of the diaphragm to form a chamber, an aperture through each substrate plate open to the center portion of the respective diaphragm plate; means forming a fluid passageway coupling the openings in each of the substrate plates;
a filling of substantially noncompressible fluid in said openings and passageways and under a pressure sufficient to support the respective diaphragm plates to be spaced from each of the substrate plates to form fluid filled chambers, whereby pressure differentials on the outer surfaces of said diaphragm plate will tend to cause one of the diaphragm plates to move toward its respective substrate plate, while the other diaphragm plate bows out further from its respective substrate plate;
a capacitor electrode deposited on each substrate plate to form a capacitor in combination with the respective diaphragm plate to permit determining relative deflecting movement of the associated plates;
each of the diaphragm plates contacting its substrate plate under pressure forces before the other diaphragm plate of the sensing cell is overstressed; and
means to permit applying separate pressures to each of the diaphragm plates.

24. The apparatus as specified in claim 23 wherein the substrate plates each have a neck portion surrounding the opening of substantially smaller diameter than the main portion of the substrate plate, said neck portions supporting the respective sensor elements on the support block.

25. The apparatus of claim 23 wherein said means to permit comprises a housing forming separate housing chambers surrounding the respective sensor elements.

26. The apparatus of claim 25 and line pressure sensor means for sensing the pressure in at least one housing chamber.

27. The differential pressure sensor of claim 23 wherein the volume of fluid in the openings and passageway is substantially less than the volume of the incompressible fluid filling each of the fluid filled chambers at equal pressure on both of the sensor elements.

28. The differential pressure sensor of claim 23 and a dielectric layer overlying the capacitor electrode on each substrate plate and surrounding the edges of the capacitor electrode and a recess in each diaphragm plate of substantially the same size and shape as the capacitor electrode and layer of dielectric fitting within the recess when the plates of one sensor element are in contact.

29. A method of manufacturing diaphragm assemblies used for a fluid pressure sensor comprising steps of providing a sheet member of brittle material having a suitable thickness, forming a plurality of openings through said sheet member at spaced intervals, depositing a coating, including a conductive portion forming an electrode on the sheet member around each opening, and separated from the conductive coatings surrounding the other openings, positioning a semiconductor material wafer having a plurality of separated diaphragm members formed thereon with each diaphragm member overlying one of said electrodes and associated opening providing a recess on one of the members aligned with each deposited conductive coating when the wafer is positioned on the glass sheet, the recess being provided to have a depth substantially equal to the thickness of the deposited coating, anodically bonding the wafer and sheet member together in regions surrounding each of the diaphragm members, and separating the bonded sections of said sheet member and wafer along lines surrounding each of said diaphragm members.

30. The method as specified in claim 29 wherein the sheet member has high resistivity and including the step of depositing conductive material onto the sheet member through the interior of the openings to be electrically connected to the conductive portion surrounding the respective opening.

31. The method of claim 29 wherein said diaphragm members comprise silicon material.

* * * * *

UNITED STATES PATENT AND TRADEMARK OFFICE
CERTIFICATE OF CORRECTION

PATENT NO. : 4,578,735

DATED : March 25, 1986

INVENTOR(S) : Thomas A. Knecht et al.

It is certified that error appears in the above-identified patent and that said Letters Patent is hereby corrected as shown below:

On the cover page, after the name of the invention, insert:
—[73] Assignee: Rosemount Inc., Eden Prairie, Minn.—.

Column 5, line 13, after "with", delete "a" and insert —an—.

Column 8, line 59, delete "diffrential" and insert —differential—.

Column 10, line 4, delete "capacitor" and insert —capacitive—.

Column 11, line 2, delete "silicion" and insert —silicon—.

Column 11, line 47, delete "has" and insert —have—.

Column 12, line 36, delete "diaphram" and insert —diaphragm—.

Column 11, line 62, after "chambers", delete "and" and insert —the—.

Column 14, line 64, delete "re" and insert —are—.

Column 15, line 3, delete "pressue" and insert —pressure—.

Signed and Sealed this

Eighteenth Day of October, 1988

Attest:

DONALD J. QUIGG

*Attesting Officer*  *Commissioner of Patents and Trademarks*